(12) United States Patent
Hainberger et al.

(10) Patent No.: US 7,773,886 B2
(45) Date of Patent: Aug. 10, 2010

(54) OPTICAL REGENERATOR IN OPTICAL FIBER COMMUNICATION SYSTEM

(75) Inventors: Rainer Hainberger, Vienna (AT); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 879 days.

(21) Appl. No.: 10/595,023

(22) PCT Filed: Jun. 30, 2003

(86) PCT No.: PCT/JP03/08316

§ 371 (c)(1),
(2), (4) Date: Dec. 20, 2005

(87) PCT Pub. No.: WO2005/004359

PCT Pub. Date: Jan. 13, 2005

(65) Prior Publication Data

US 2007/0104491 A1    May 10, 2007

(51) Int. Cl.
*H04J 14/02* (2006.01)
(52) U.S. Cl. ............................ 398/97; 398/37; 398/177
(58) Field of Classification Search ................... 398/31, 398/37, 97, 173–181, 197
See application file for complete search history.

(56) References Cited

U.S. PATENT DOCUMENTS

| | | | |
|---|---|---|---|
| 5,350,913 A | 9/1994 | Aoshima et al. | |
| 5,532,861 A * | 7/1996 | Pirio et al. | 398/149 |
| 5,657,154 A | 8/1997 | Yoneyama | |
| 5,812,710 A | 9/1998 | Sugaya | |
| 5,959,766 A * | 9/1999 | Otterbach et al. | 359/337 |
| 6,038,063 A * | 3/2000 | Tsuda et al. | 359/341.41 |
| 6,055,092 A * | 4/2000 | Sugaya et al. | 359/341.41 |
| 6,141,129 A | 10/2000 | Mamyshev | |
| 6,433,899 B1 | 8/2002 | Anslow et al. | |
| 6,504,637 B1 | 1/2003 | Yokoyama et al. | |
| 6,731,874 B2 * | 5/2004 | Tsushima et al. | 398/45 |
| 6,738,173 B2 * | 5/2004 | Bonthron et al. | 359/238 |
| 6,859,307 B2 * | 2/2005 | Takeda et al. | 359/337 |
| 7,057,802 B2 | 6/2006 | Kajiya et al. | |
| 7,139,478 B2 * | 11/2006 | Eggleton et al. | 398/29 |
| 7,463,829 B2 * | 12/2008 | Uda et al. | 398/97 |
| 2001/0021288 A1 | 9/2001 | Watanabe et al. | |
| 2003/0137721 A1 * | 7/2003 | Kajiya et al. | 359/337.1 |
| 2003/0231886 A1 * | 12/2003 | Young et al. | 398/101 |

FOREIGN PATENT DOCUMENTS

| | | |
|---|---|---|
| JP | 5-303125 | 11/1993 |
| JP | 8-248455 | 9/1996 |

(Continued)

OTHER PUBLICATIONS

Japanese Patent Office Notice of Rejection Grounds, mailed Nov. 28, 2006, and issued in corresponding Japanese Patent Application 2005-503373.

(Continued)

*Primary Examiner*—Dzung D Tran
(74) *Attorney, Agent, or Firm*—Fujitsu Patent Center

(57) ABSTRACT

In an optical fiber communication system, the input power to an all-optical nonlinear device in an optical regenerator is monitored and adjusted such that the regenerator operates at an optimized operation point.

8 Claims, 16 Drawing Sheets

FOREIGN PATENT DOCUMENTS

| | | |
|---|---|---|
| JP | 8-288916 | 11/1996 |
| JP | 9-211507 | 8/1997 |
| JP | 2001-249371 | 9/2001 |
| JP | 2002-16550 | 1/2002 |
| WO | WO0201684 A1 | 1/2002 |

OTHER PUBLICATIONS

Notice of Grounds Rejection for Japanese Patent Application No. 2005-503373; mailed Jun. 27, 2006.

Neal S. Bergano, "Undersea Amplified Lightwave Systems Design", in Kaminov et al., Optical Fiber Telecommunications, vol. IIIA, Chapter 10, 1997, pp. 302-335.

N. S. Bergano et al., "Margin Measurements in Optical Amplifier Systems", IEEE Photonics Technology Letters, vol. 5, No. 3, Mar. 1993, pp. 304-306.

Akira Hirano et al., "All-Optical Discrimination Based on Nonlinear Transmittance of MQW Semiconductor Optical Gates", Journal of Lightwave Technology, vol. 17, No. 5, May 1999, pp. 873-884.

Ernesto Ciaramella et al., "All-Optical Signal Reshaping via Four-Wave-Mixing in Optical Fibers", IEEE Photonics Technology Letters, vol. 12, No. 7, Jul. 2000, pp. 849-851.

Mingshan Zhao et al., "All-Optical 2R Regeneration Based on Polarization Rotation in a Linear Optical Amplifier", IEEE Photonics Technology Letters, vol. 15, No. 2, Feb. 2003, pp. 305-307.

P. V. Mamyshev, "All-Optical Data Regeneration Based on Self-Phase Modulation Effect", ECOC'98, Sep. 1998, Madrid, Spain, pp. 475-476.

\* cited by examiner

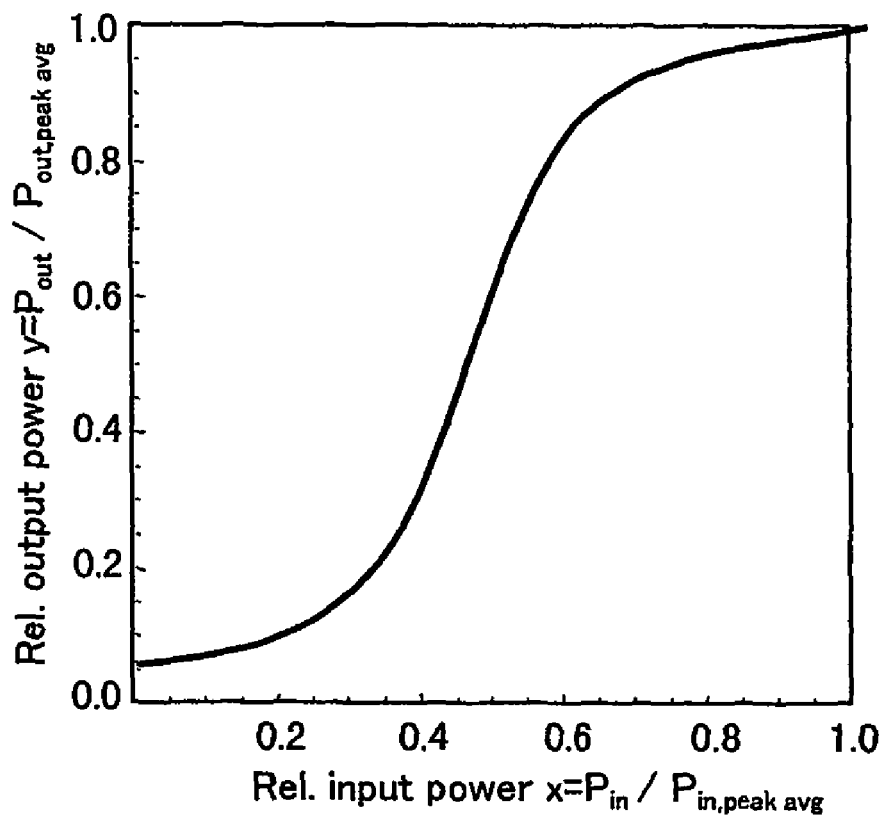
F I G. 1

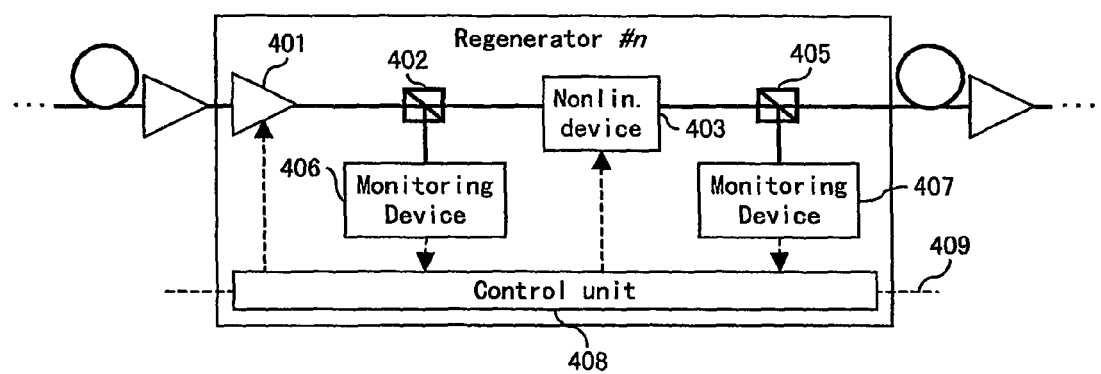
F I G. 7

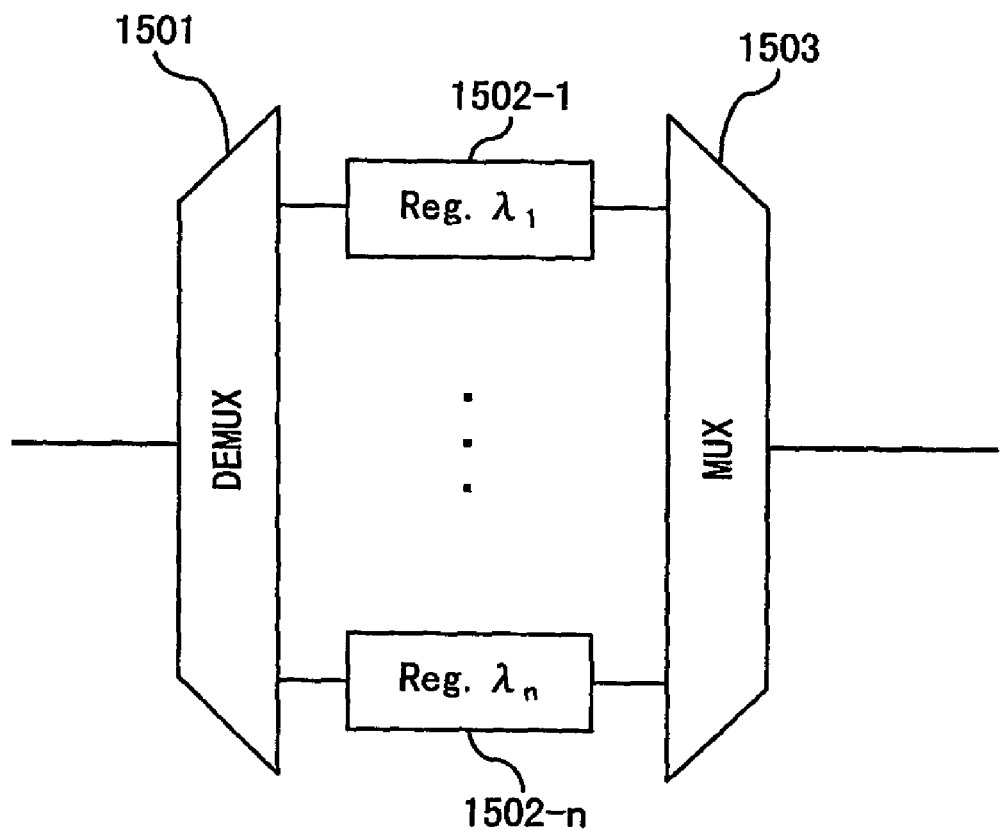
F I G. 15

OPTICAL REGENERATOR IN OPTICAL FIBER COMMUNICATION SYSTEM

TECHNICAL FIELD

The present invention relates to optical regenerators, especially all-optical regenerators, employed in optical fiber communication systems.

BACKGROUND ART

In optical fiber communication systems the quality of an optical signal gradually decreases as it propagates along the fiber. The following various effects impair the signal.

Accumulation of amplified spontaneous emission (ASE) noise originating from optical amplifiers, i.e. gradual decrease of the optical signal-to-noise ratio (OSNR)

Chromatic dispersion

Nonlinear effects (self phase modulation, cross phase modulation, four wave mixing, etc.)

Polarization mode dispersion

The accumulation of ASE noise does not change the optical signal waveform. However, at the receiver, where the optical signal is converted into an electrical current, the beat noise between the data signal and the ASE light, and the beat noise of the ASE light with itself cause electrical noise.

The latter three effects distort the optical signal waveform. The distortions due to chromatic dispersion can in principle be compensated by a dispersion compensating fiber. However, the interplay of chromatic dispersion with self- and cross-phase modulation as well as other nonlinear effects and polarization mode dispersion result in irrecoverable impairment.

In the evaluation of an optical fiber communication system, the bit error rate (BER) is usually used as a parameter for the system performance. The BER is defined as the probability that a bit is erroneously received, i.e. the probability that either a logical one (mark) is detected as a zero or a logical zero (space) as a one. The BER is given by $$BER(x) = \frac{1}{2}\left[\int_{-\infty}^{x} pdf_1(x')dx' + \int_{x}^{\infty} pdf_0(x')dx'\right],$$

where $pdf_1$ and $pdf_0$ are the probability distribution functions of the detected voltages of marks and spaces, respectively at the center of the eye pattern, and x is the decision threshold.

Provided that the ASE noise causes the most severe impairment, the noise at the receiver in conventional systems without all-optical regeneration can be modeled as Gaussian noise (see non-patent document 1, for example). The probability distribution functions of the detected voltages of marks and spaces can thus be approximated by $$pdf_i(x) = \frac{1}{\sqrt{2\pi}\,\sigma_i}\exp\left(\frac{(x-\mu_i)^2}{2\sigma_i^2}\right), \quad (i=0,1)$$

where $\mu_1$ and $\mu_0$ are the mean values and $\sigma_1$ and $\sigma_0$ the standard deviations for marks and spaces, respectively.

In the Gaussian approximation, the BER at the optimized threshold voltage can be expressed analytically as $$BER = \frac{1}{2}\mathrm{erfc}\left(\frac{Q}{\sqrt{2}}\right)$$

with the Gaussian error function $$\mathrm{erfc}(y) = \int_{y}^{\infty} e^{-\xi^2/2}d\xi$$

and the so-called Q-factor (see non-patent document 2, for example)

$$Q = \frac{\mu_1 - \mu_0}{\sigma_0 + \sigma_1}.$$

In order to regain the OSNR and eliminate signal distortions regenerators are used. Conventional regenerators consist of an optical receiver and a transmitter. The receiver converts the optical signal to an electrical signal. The receiver comprises an electrical clock extraction circuit and a decision circuit, which discriminates the incoming marks and spaces. The transmitter converts the thus regenerated electrical signal back into an optical signal.

In the case of all-optical regenerators the conversion into an electrical signal is avoided by processing the signal utilizing nonlinear optical effects. While 2R regenerators only re-amplify and re-shape (therefore 2R) the optical signal, 3R regenerators also perform re-timing (therefore 3R).

The central component of an all-optical regenerator is a nonlinear device that provides a nonlinear transfer function between optical input and output power. A variety of all-optical nonlinear devices have been demonstrated, such as semiconductor optical amplifiers (SOAs)

nonlinear optical loop mirrors (NOLMs)

saturable absorber switches (see patent document 1 and non-patent document 3, for example)

four wave mixing (see non-patent document 4, for example)

polarization rotation switch (see non-patent document 5, for example)

spectrally broadening fiber (see non-patent document 6 and patent document 2, for example).

The function of an ideal nonlinear device with a typical transfer function as depicted in FIG. 1 is to redistribute the pdfs of marks and spaces. In the ideal case, this transfer function is bit pattern independent. If an ideal receiver is used to detect the signal before and after the nonlinear device at an optimized decision threshold, the BER stays the same. If, however, further ASE noise is added behind the nonlinear device, the BER does not stay the same and depends strongly on the shape of the output pdf after the nonlinear device. Accordingly, the BER can be minimized if the pdf is redistributed in an optimized way.

In systems with all-optical regenerators, the Gaussian approximation of the pdfs and thus the concept of the Q-value can be used only as a rough approximation due to the nonlinear transformation of the pdfs of marks and spaces. The signal quality needs to be quantified by direct BER measurements at an optimized decision threshold or by measuring the combined pdf of marks and spaces in the center of the eye pattern. There is a method of monitoring the quality of the optical signal at the site of 2R or 1R (only re-amplify) regenerator without performing a clock recovery operation (see patent document 3, for example). The optimization of the decision threshold when measuring the BER requires sweeping the decision threshold voltage.

Optical regenerators not only require means to monitor the optical signal but also means to transmit the monitor information over the transmission system. A monitoring system for all-optical regenerators and an all-optical regenerator employing this monitoring system have already been disclosed (see patent documents 4 and 5, for example).

Non-Patent Document 1

Ed. Kaminov and Koch, "Optical Fiber Telecommunications IIIA", Chapter 10, Academic Press, pp. 302-335, 1997

Non-Patent Document 2

N. S. Bergano, F. W. Kerfoot, and C. R. Davidson, "Margin measurements in optical amplifier systems", IEEE Photonics Technology Letters, Vol. 5, No. 3, pp. 304-306, March 1993

Non-Patent Document 3

A. Hirano, H. Tsuda, H. Kobayashi, R. Takahashi, M. Asobe, K. Sato, and K. Hagimoto, "All-optical discrimination based on nonlinear transmittance of MQW semiconductor optical gates", Journal of Lightwave Technology, Vol. 17, No. 5, pp. 873-884, May 1999

Non-Patent Document 4

E. Ciaramella and S. Trillo, "All-optical signal reshaping via four-wave-mixing in optical fibers", IEEE Photonics Technology Letters, Vol. 12, No. 7, pp. 849-851, July 2000

Non-Patent Document 5

M. Zhao, J. D. Merlier, G. Morthier, and R. Baets, "All-optical 2R regeneration based on polarization rotation in a linear optical amplifier", IEEE Photonics Technology Letters, Vol. 15, No. 2, pp. 305-307, February 2003

Non-Patent Document 6

P. V. Mamyshev, "All-optical data regeneration based on self-phase modulation effect", ECOC'98 September 1998, Madrid, Spain, pp. 475-476

Patent Document 1

U.S. Pat. No. 6,504,637 B1

Patent Document 2

U.S. Pat. No. 6,141,129

Patent Document 3

U.S. Pat. No. 6,433,899 B1

Patent Document 4

U.S. Pat. No. 5,657,154

Patent Document 5 publication of Japan patent application, H08-288916

DISCLOSURE OF INVENTION

An objective of the present invention is to provide an optical regenerator with monitoring means that allows the optical regenerator to operate at an optimized operation point.

Another objective of the present invention is to provide a method for determining the optimized operation point of a regenerator at the time of installation in an optical fiber communication system.

Yet another objective of the present invention is to provide a method for adjusting and fine-tuning the optimized operation point of the regenerator during operation of the optical fiber communication system.

As described above, the BER of an optical signal after a nonlinear device can be minimized if the pdf is redistributed in an optimized way. Since the transfer function of a nonlinear device usually is fixed, the only parameter that can be changed is the input power of the signal. In the present invention, optical regenerators in which the input power to the nonlinear device is adjustable are proposed.

In the first aspect of the present invention, the optical regenerator comprises an optical amplifier at an input of the regenerator, an all-optical nonlinear device, an adjusting device, a first monitoring device, a second monitoring, and a control unit.

The all-optical nonlinear device provides a nonlinear transfer function between optical input power of an optical signal after the optical amplifier and optical output power of an optical signal after the nonlinear device. The adjusting device adjusts the optical output power to a level of launch power from the regenerator. The first monitoring device monitors the optical signal after the optical amplifier and outputs a first monitoring signal. The second monitoring device monitors an optical signal after the adjusting device and outputs a second monitoring signal. The control unit receives the first and second monitoring signals and controls the optical amplifier based on the first monitoring signal and the adjusting device based on the second monitoring signal.

In the second aspect of the present invention, the optical regenerator comprises an optical amplifier at an input of the regenerator, an all-optical nonlinear device, a monitoring device, and a control unit.

The all-optical nonlinear device provides a nonlinear transfer function between optical input power of an optical signal after the optical amplifier and optical output power of an optical signal after the nonlinear device. The monitoring device monitors the optical signal after the optical amplifier and outputs a monitoring signal. The control unit receives the monitoring signal and controls the optical amplifier based on the monitoring signal.

BRIEF DESCRIPTION OF DRAWINGS

FIG. 1 shows a typical transfer function of an all-optical nonlinear device.

FIG. 7 shows an optical regenerator comprising a laser source in a nonlinear device to adjust the output power.

FIG. 15 shows a configuration of a regenerator node in a WDM system in which an optical signal with each wavelength is regenerated separately.

BEST MODE FOR CARRYING OUT THE INVENTION

Figure 2:
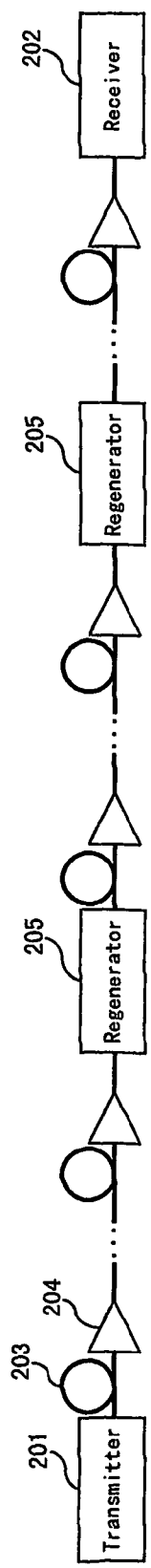
FIG. 2 shows an optical transmission system comprising an optical transmitter and an optical receiver.

Hereinafter, preferred embodiments according to the present invention will be described in detail by referring to the drawings.

FIG. 2 shows an optical transmission system employing optical regenerators. The optical transmission system comprises an optical transmitter 201, an optical receiver 202, an optical fiber 203 for connecting the transmitter with the receiver, and optical amplifiers 204 and optical regenerators 205 along the optical fiber 203. The optical amplifiers 204 compensate absorption losses of the signal light passing through the optical fiber 203.

Figure 3:
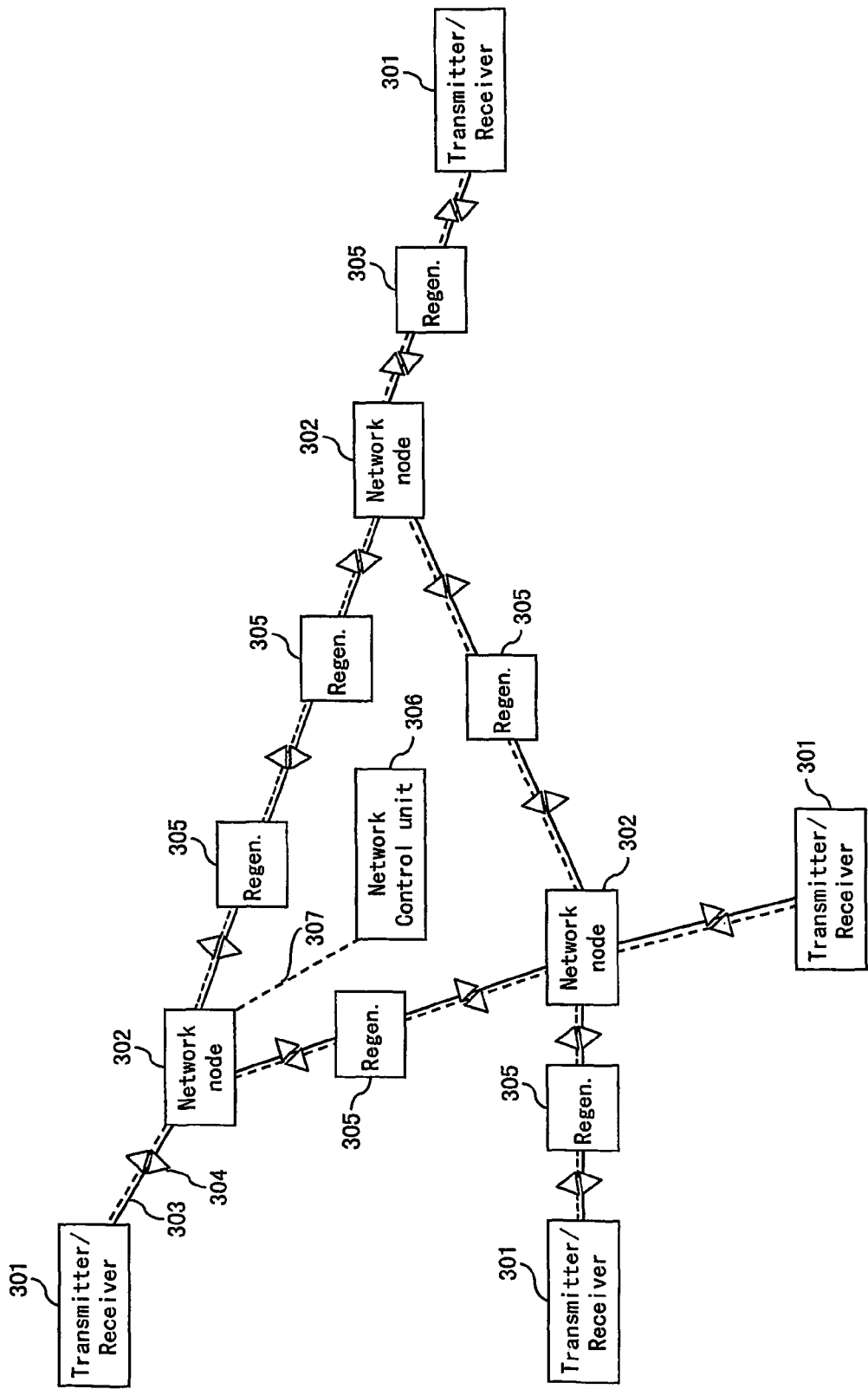
FIG. 3 shows a reconfigurable optical network comprising optical transmitters and optical receivers.

FIG. 3 shows a reconfigurable optical network employing optical regenerators. The reconfigurable optical network comprises optical terminating equipment 301 (optical transmitters and optical receivers), at least one optical reconfigurable network node 302, optical fibers 303 connecting the transmitters with the receivers via the network nodes 302, optical amplifiers 304 and optical regenerators 305 along the optical fibers 303, and a network control unit 306. Optical cross-connects (OXCs) or optical add-drop multiplexers (OADMs) can be employed in the network nodes 302. The optical amplifiers 304 compensate absorption losses of the signal light passing through the optical fiber 303 and the network control unit 306 communicates with the network elements 301, 302, and 305 via an optical supervisory channel 307.

In the configurations shown in FIGS. 2 and 3, the optical regenerators 205 and 305 are provided in repeater sites (regenerator nodes) along the optical fibers 203 and 303, respectively.

Figure 4:
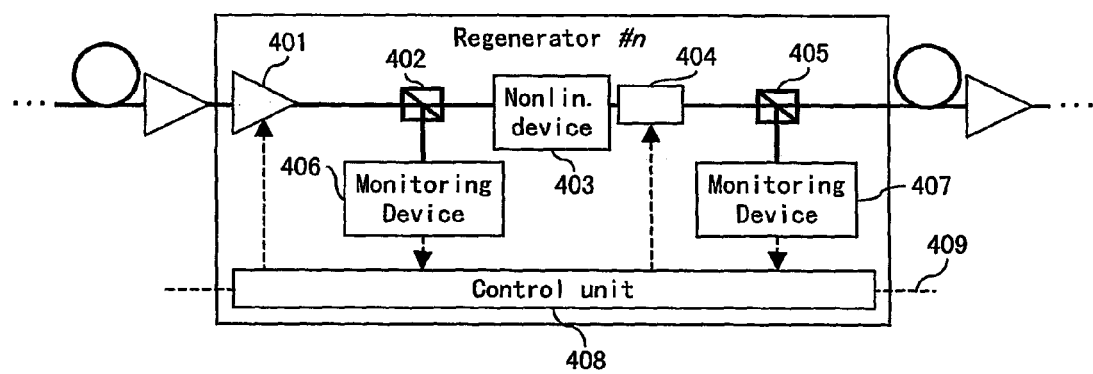
FIG. 4 shows a basic configuration of an optical regenerator according to the present invention.

The basic configuration of an optical regenerator in a repeater site is shown in FIG. 4. The optical regenerator comprises an optical amplifier 401, optical couplers 402 and 405, a non linear device 403, an adjusting device 404, monitoring devices 406 and 407, and a control unit 408. The optical amplifier 401 in front of the nonlinear device 403 allows the adjustment of the signal input power to the nonlinear device 403.

A part (fraction) of the signal light is tapped using the optical coupler 402 for the monitoring device 406 monitoring the optical power. Alternatively, or in addition, the BER or the combined pdf of marks and spaces in the center of the eye pattern can be monitored by the monitoring device 406. A band-pass filter can be placed between the optical amplifier 401 and the optical coupler 402 in order to suppress out-of-band ASE noise.

Figure 5:
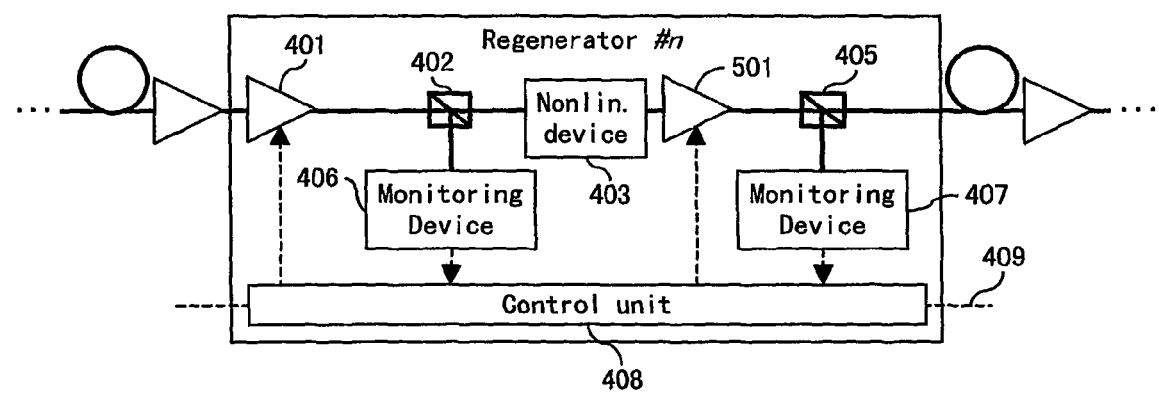
FIG. 5 shows an optical regenerator comprising an optical amplifier to adjust the output power.
Figure 6:
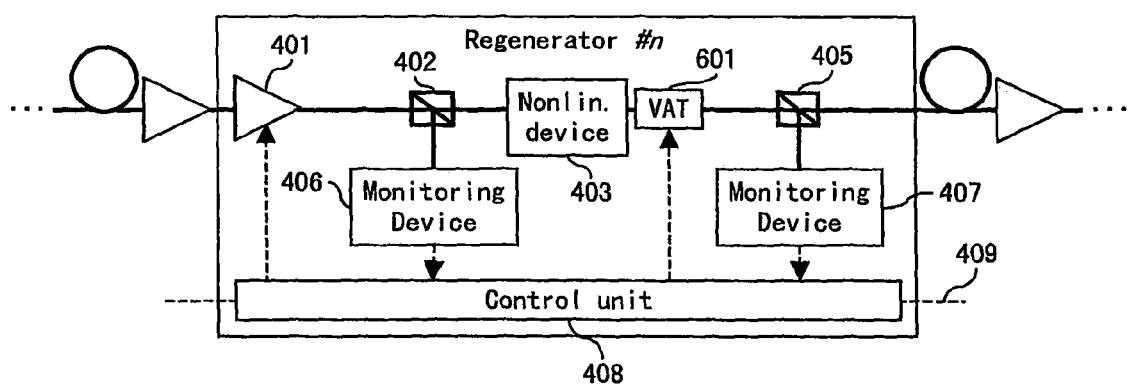
FIG. 6 shows an optical regenerator comprising a variable attenuator to adjust the output power.

At the output of the nonlinear device 403 the optical power has to be adjusted to the level of the launch power into the next transmission span. The adjusting device 404 is provided for this purpose. The method for power adjustment depends on the type of the nonlinear device 403 employed. If the output power of the nonlinear device 403 is lower than the launch power into the next fiber span, an optical amplifier is used as shown in FIG. 5. An optical amplifier 501 at the output of the nonlinear device 403 allows the amplification of the output power. If the output power is larger than the launch power into the next fiber span, a variable attenuator is used as shown in FIG. 6. A variable attenuator (VAT) 601 at the output of the nonlinear device 403 allows the attenuation of the output power. In the case of a nonlinear device 403 where a laser source is provided and the output can be controlled in the nonlinear device (adjustable laser output power), neither an optical amplifier nor an attenuator is required as shown in FIG. 7.

In front of the regenerator output, a part of the signal light is tapped using the optical coupler 405 for monitoring the optical output power or the optical signal quality (e.g. BER or combined pdf of marks and spaces in the center of the eye pattern). If necessary, an optical band-pass filter can be placed in front of the optical coupler 405 in order to suppress out-of-band ASE noise originating from the second amplifier 501 or from the nonlinear device 403 (in case of SOA-based devices).

The control unit 408 inside the regenerator includes an electronic control circuit which processes the monitoring signals from the monitoring devices 406 and 407 and carries out the adjustments of the input power to the nonlinear device 403 and the output power of the regenerator. The control circuit controls the first amplifier 401 to adjust the input power and the second amplifier 501, the variable attenuator 601, or the laser power in the nonlinear device 403 to adjust the output power. Furthermore, the control unit 408 is equipped with means to receive and transmit supervisory data over an optical supervisory channel 409 to a central network control unit or to other regenerator nodes.

The target value for the output power is determined during the system design and can thus be preset immediately at the time of installation of the system. The optimized operation point of the regenerator, characterized by the input power to the nonlinear device 403, might also be roughly determined during the design process, but needs an adjustment at the time of installation due to device variations and the limited accuracy of the design procedure.

In the following various preferred embodiments of the regenerator and the related installation methods in optical communication systems will be described. Note that the term BER is used in the sense of BER at the optimized decision threshold.

The BER is either determined using an external portable BER measurement equipment or using a built-in signal quality monitor in the optical regenerator. The portable BER measurement equipment is available only at the time of installation (or when carrying out a manual system check) whereas the signal quality monitor is permanently available. The signal quality monitor monitors the BER itself or other signal quality information such as the combined pdf of marks and spaces at the center of the eye diagram.

Embodiment 1

Figure 8:
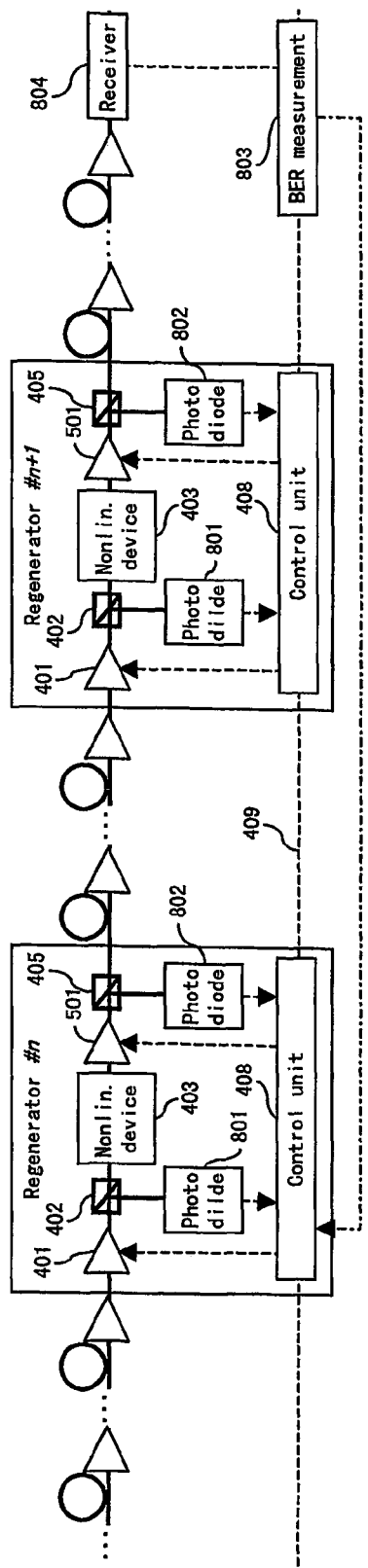
FIG. 8 shows an optical transmission system in which the optimum operation point of each optical regenerator is determined by minimizing the BER at the receiver side.
Figure 9:
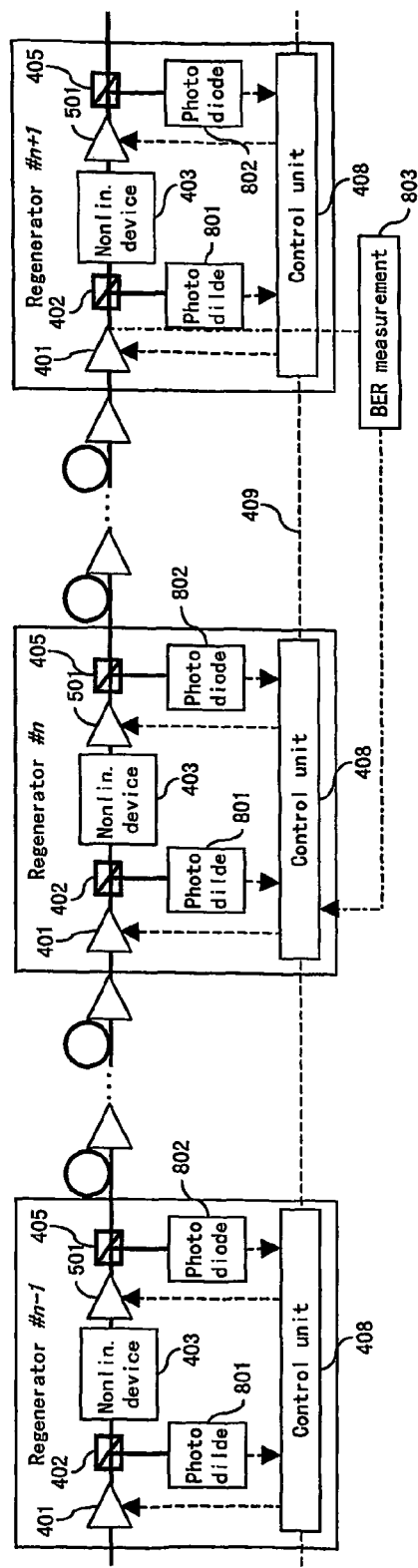
FIG. 9 shows an optical transmission system in which the optimum operation point of each optical regenerator is determined by minimizing the BER at the site of the next optical regenerator.

In the first preferred embodiment shown in FIGS. 8 and 9, the monitoring devices 406 and 407 comprise photodiodes 801 and 802, respectively, for measuring the optical power levels. The electrical signal of the first photodiode 801 is used to adjust the input power to the nonlinear device 403 to a preset value. The electrical signal of the second photodiode 802 is used to adjust the output power of the regenerator to a preset value. The control unit 408 carries out the adjustments and communicates with a central network control unit or other regenerator nodes via the optical supervisory channel 409.

The target value for the optical input power to the nonlinear device 403 is preset at the time of installation of the system as a target value of the average input power detected by the first photodiode 801. The optimum target value has to be determined at the time of installation. There are two preferred methods:

a) The BER is monitored with a BER measurement equipment 803 at the receiver side of the total system as shown in FIG. 8, and the BER value is transmitted from the BER measurement equipment 803 via the optical supervisory channel 409 to the site of the n-th regenerator as a feedback signal for adjusting the input power to the nonlinear device 403. The signal from the photodiode 801 is monitored and the value of the photodiode signal at which the minimum BER is achieved is stored as the target value in the control unit 408. The procedure is carried out for each regenerator in the backward direction, i.e. starting from the regenerator closest to the receiver 804 (the last regenerator of an optical signal path). Thus, the optimum operation point of each regenerator is determined at the time of installation by minimizing the BER at the receiver side of the optical signal path.

b) When determining the target value for the n-th regenerator, the BER is monitored with the BER measurement equipment 803 at the site of the (n+1)-th regenerator (or the receiver, if the n-th regenerator is the last one) as shown in FIG. 9. The BER value is transmitted to the site of the n-th regenerator via the optical supervisory channel 409 and used there as a feedback signal for optimizing the input power to the nonlinear device 403. The signal from the photodiode 801 is monitored and the value of the photodiode signal at which the minimum BER is achieved is stored as the target value in the control unit 408. The procedure is carried out for each regenerator in the forward direction, i.e. starting from the regenerator closest to the transmitter (the first regenerator of an optical signal path). Thus, the optimum operation point of each regenerator is determined by minimizing the BER at the site of the next regenerator in the optical signal path.

During the operation of the system the control unit 408 controls the amplifier 401 such that the monitored signal of the photodiode 801 approaches the target value. If the optical regenerator of this first embodiment is employed in a reconfigurable optical network as shown in FIG. 3, the target value of the input power to the nonlinear device 403 depends on the optical path of the signal and thus needs to be changed each time a new optical path is established by reconfiguring the network. The optimized input power values of each regenerator can either be determined each time the network is reconfigured according to method a), or be determined for all possible configurations at the time of installation of the system according to one of the methods a) and b) and stored in a table in the central network control unit.

Variations of target value setting procedures in embodiment 1 are summarized as follows.

1. At the time of installation of an optical transmission system 1-1. Carried out at least once: a procedure in which the optimum input power to the nonlinear device in each regenerator is optimized by minimizing the BER at the receiver. The procedure starts at the last regenerator and is carried out regenerator by regenerator in backward direction.

1-2. Carried out once: a procedure in which the optimum input power to the nonlinear device in each regenerator is optimized by minimizing the BER in front of the nonlinear device in the subsequent regenerator (or at the receiver in case of the last regenerator). The procedure starts at the first regenerator and is carried out regenerator by regenerator in forward direction.

2. During operation of an optical transmission system Procedure 1-1. as described above, if the BER detected at the receiver increases above a certain limit.

3. At the time of installation of a reconfigurable optical network 3-1. Same as procedure 1-1.

3-2. Same as procedure 1-2.

4. After network reconfiguration

Same as procedure 1-1.

Embodiment 2

Figure 10:
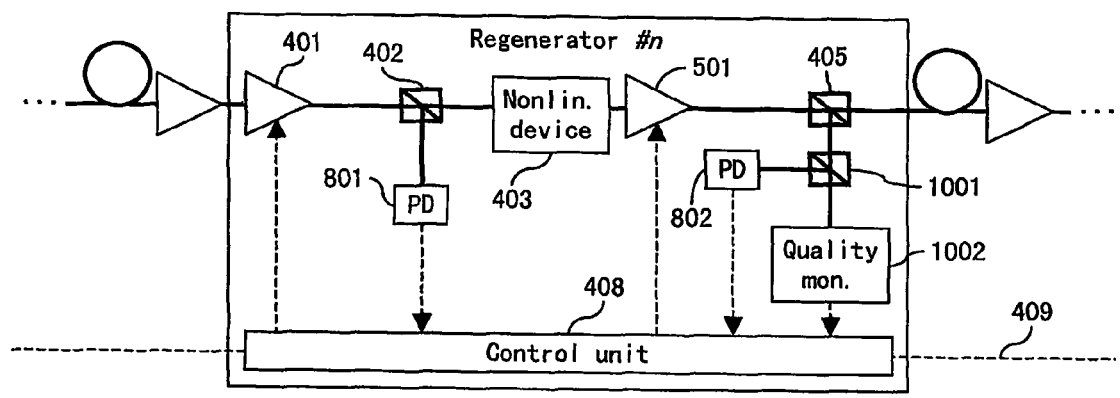
FIG. 10 shows an optical regenerator in which the signal quality is monitored behind a nonlinear device.
Figure 11:
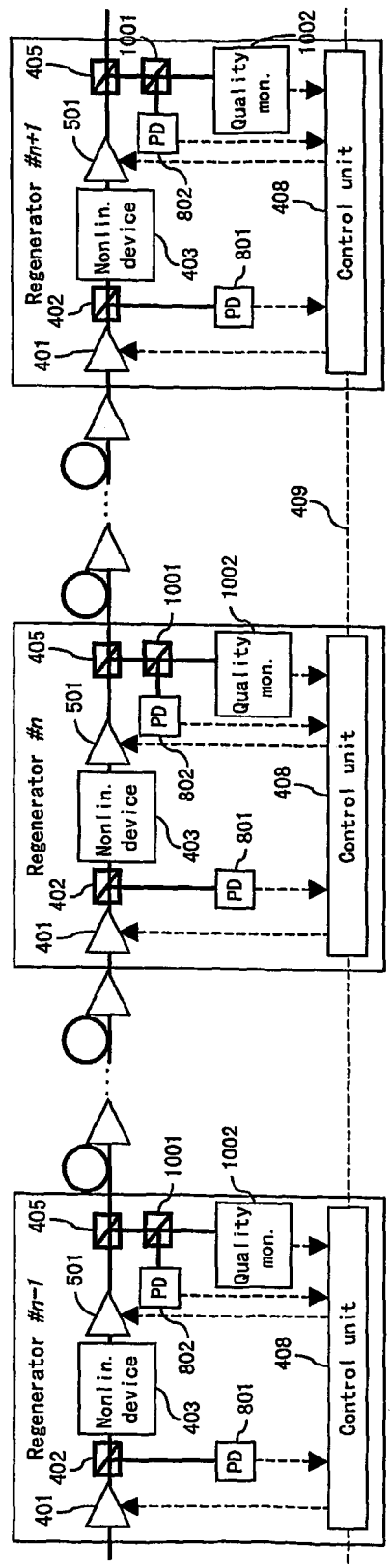
FIG. 11 shows an optical transmission system with optical regenerators in which the signal quality is monitored behind a nonlinear device.

In the second preferred embodiment, each regenerator shown in FIGS. 8 and 9 is replaced with a regenerator as shown in FIG. 10 and the optical communication system is configured as shown in FIG. 11. The BER measurement equipment is not required. In this case, the monitoring device 406 comprises a photodiode 801, and the monitoring device 407 comprises a photo diode 802, an optical coupler 1001, and a signal quality monitor 1002. The electrical signal of the first photodiode 801 is used to adjust the input power to the nonlinear device 403 to a preset value. The signal light tapped by the optical coupler 405 branches at the optical coupler 1001 to the photodiode 802 and the signal quality monitor 1002. The electrical signal of the second photodiode 802 is used to adjust the output power of the regenerator to a preset value. The signal quality monitor 1002 monitors the signal quality (BER, the minimum of the pdf, etc.) of the output signal light of the regenerator. The control unit 408 carries out the adjustments. The signal quality data is transmitted to a central network control unit of the communication system via the optical supervisory channel 409.

The target values for the optical input power to the nonlinear device 403 and the optical output power of the regenerator are preset in the same way as in embodiment 1. Accordingly, variations of target value setting procedures in embodiment 2 are same as those in embodiment 1 except that the signal quality is monitored behind the nonlinear device 403 in the subsequent regenerator. During the operation of the system the control unit 408 controls the amplifier 401 such that the monitored signal of the signal quality monitor 1002 approaches the target value for the optical input power.

Embodiment 3

Figure 12:
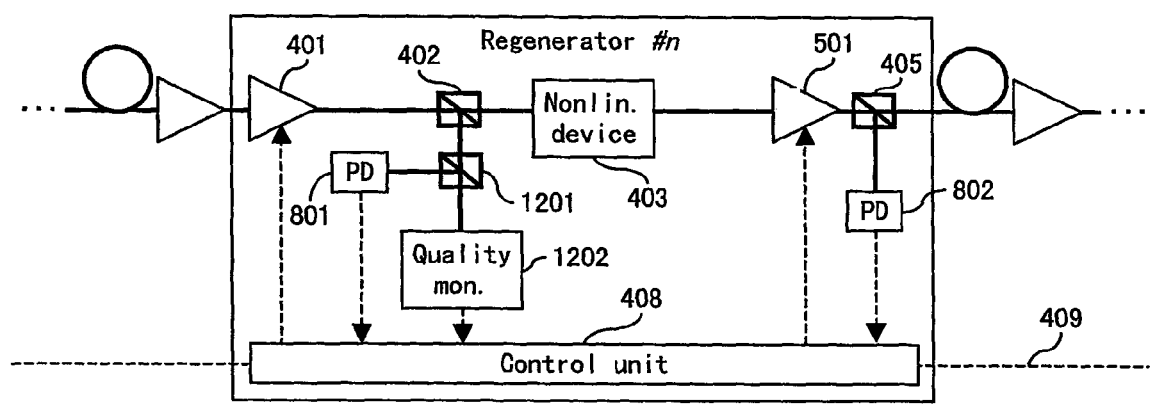
FIG. 12 shows an optical regenerator in which the signal quality is monitored in front of a nonlinear device.
Figure 13:
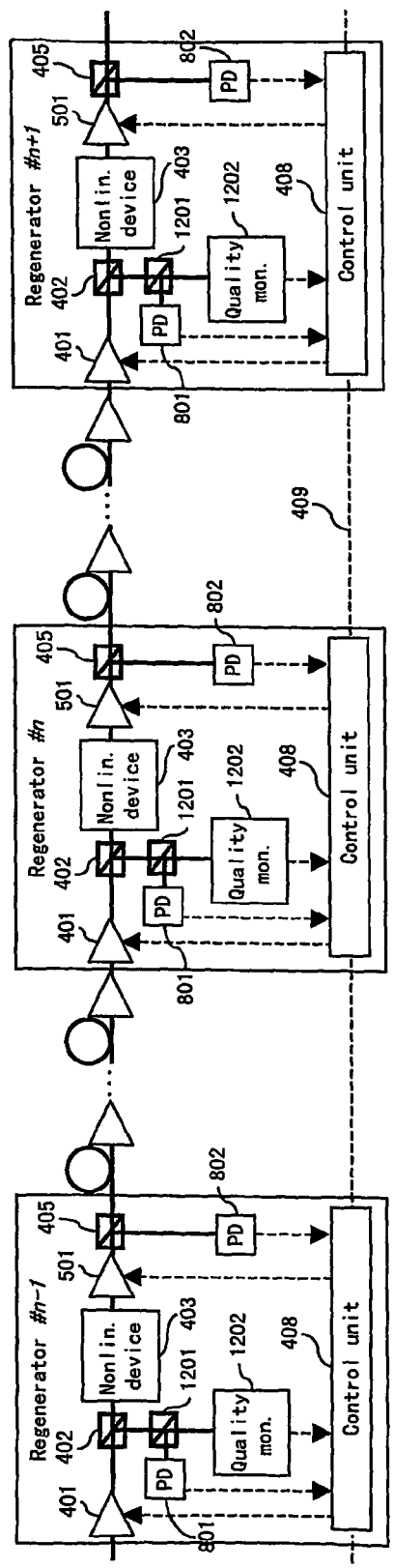
FIG. 13 shows an optical transmission system with optical regenerators in which the signal quality is monitored in front of a nonlinear device.

In the third preferred embodiment, the monitoring devices 406 comprises a photodiode 801 for measuring the optical power, an optical coupler 1101, and a signal quality monitor 1102, and the monitoring device 407 comprises a photodiode 802 as shown in FIGS. 12 and 13. The signal light tapped by the optical coupler 402 branches at the optical coupler 1101 to the photodiode 801 and the signal quality monitor 1102. The electrical signal of the first photodiode 801 is used to adjust the input power to the nonlinear device 403 to a preset value. The electrical signal of the second photodiode 802 is used to adjust the output power of the regenerator to a preset value. The signal quality monitor 1102 monitors the signal quality of the input signal light to the nonlinear device 403. The control unit 408 carries out the adjustments. The adjustment of the optical input power to the nonlinear device 403 can be carried out during the operation of the optical communication system in two ways:

a) Decentralized: the (n+1)-th regenerator (or the receiver, if the n-th regenerator is the last one) sends a feedback signal to the n-th regenerator in the system via the optical supervisory channel 409. The received feedback signal is either the monitoring signal (BER, the minimum of the pdf, etc.) itself or a control signal for the amplifier 401. In the former case, the control unit 408 of the n-th regenerator controls the amplifier 401 of the same regenerator. In the latter case, the control unit 408 of the (n+1)-th regenerator (or of the receiver in the case of the last regenerator) controls the amplifier 401 of the n-th regenerator. The adjustment procedure is sequential and starts at the first regenerator of the optical signal path. When the adjustment of the last regenerator is finished, the procedure starts again at the first regenerator in order to apply the adjustments repeatedly. Thus, the operation point of the regenerator is adjusted during the operation of the system by optimizing the signal quality in front of the nonlinear device 403 of the next regenerator in the system.

b) Centralized: a central network control unit communicates with the regenerators and the receiver via the optical supervisory channel 409. It receives the signal quality status of each regenerator and the receiver and adjusts the input power to the nonlinear device 403 in each n-th regenerator in order to optimize the signal quality at the (n+1)-th regenerator (or receiver in case of the last regenerator) starting from the first regenerator and proceeding in forward direction along the optical signal path.

Variations of target value setting procedures in embodiment 3 are summarized as follows.

1. At the time of installation of an optical transmission system

No specific procedure.

2. During operation of an optical transmission system

A procedure in which the optimum input power to the nonlinear device in each regenerator is optimized by optimizing the signal quality in front of the nonlinear device in the subsequent regenerator (or at the receiver in case of the last regenerator). The procedure starts at the first regenerator and is carried out regenerator by regenerator in forward direction. The procedure can be repeated continuously or if the signal quality becomes worse than a certain threshold level.

3. At the time of installation of a reconfigurable optical network

No specific procedure.

4. After network reconfiguration

A procedure in which the optimum input power to the nonlinear device in each regenerator is optimized by optimizing the signal quality in front of the nonlinear device in the subsequent regenerator (or at the receiver in case of the last regenerator). The procedure starts at the first regenerator and is carried out regenerator by regenerator in forward direction. The procedure can be repeated continuously or if the signal quality becomes worse than a certain threshold level. The procedure is carried out centralized, i.e. the central network control unit communicates with the regenerators.

Embodiment 4

In the fourth preferred embodiment, the optical communication system shown in FIGS. 10 and 11 is employed. In one method to control the input power, the signal quality can be used as a feedback in the same way as described in embodiment 3. Thus, the operation point of the regenerator is adjusted during the operation of the system by optimizing the signal quality behind the nonlinear device 403 of the next regenerator in the system.

Another method to control the input power in the fourth embodiment is to use the signal quality information of the same regenerator (e.g. combined pdf of marks and spaces at the center of the eye diagram). Although the BER does not change very much between before and after the nonlinear device 403 in the same regenerator, the shape of the combined pdf does. From this point of view it is preferred to monitor the combined pdf as the signal quality information of the same regenerator. Target values for the optical input power to the nonlinear device 403 (e.g. key parameters characterizing the combined pdf or a mask, which represents the target shape of the combined pdf) are defined at the time of installation or at the time of reconfiguration of the optical communication system. The mask of the shape of the combined pdf can be defined by performing the control of the former method in embodiment 4.

Variations of target value setting procedures in embodiment 4 are summarized as follows.

1. At the time of installation of an optical transmission system 1-1. No specific procedure.

1-2. The target values of the signal quality parameters of the n-th regenerator (e.g. key parameters defining the target shape of the combined pdf of marks and spaces) are determined at the time of installation using a procedure where the signal quality (BER or the minimum of the pdf) of the (n+1) -th regenerator (or at the receiver in case of the last regenerator) is optimized by adjusting the input power of the n-th regenerator. The procedure is carried out in forward direction and the signal quality parameters of all regenerators at this optimized setting are stored.

2. During operation of an optical transmission system 2-1. A procedure in which the optimum input power to the nonlinear device in each regenerator is optimized by optimizing the signal quality behind the nonlinear device in the subsequent regenerator (or at the receiver in case of the last regenerator). The procedure starts at the first regenerator and is carried out regenerator by regenerator in forward direction. The procedure can be repeated continuously or if the signal quality becomes worse than a certain threshold level.

2-2. The input power is adjusted using the signal quality parameters of the same regenerator (e.g. combined pdf of marks and spaces at the center of the eye diagram). The target values (e.g. key parameters defining the target shape of the combined pdf of marks and spaces) are determined at the time of installation and can be re-adjusted if necessary later by repeating the procedure described for the time of installation.

3. At the time of installation of a reconfigurable optical network 3-1. No specific procedure.

3-2. The target values of the signal quality parameters of the n-th regenerator in the optical path (e.g. key parameters defining the target shape of the combined pdf of marks and spaces) are determined at the time of installation using a procedure where the signal quality (BER or the minimum of the pdf) of the (n+1)-th regenerator is optimized by adjusting the input power of the n-th regenerator. The procedure is carried out in forward direction for every possible network configuration and the signal quality parameters at this optimized setting are stored.

4. After network reconfiguration 4-1. A procedure in which the optimum input power to the nonlinear device in each regenerator is optimized by optimizing the signal quality behind the nonlinear device in the subsequent regenerator (or at the receiver in case of the last regenerator). The procedure starts at the first regenerator and is carried out regenerator by regenerator in forward direction. The procedure can be repeated continuously or if the signal quality becomes worse than a certain threshold level. The procedure is carried out centralized, i.e. the central network control unit communicates with the regenerators.

4-2. Use of the signal quality parameters of the same regenerator (e.g. combined pdf of marks and spaces at the center of the eye diagram). The target values (e.g. key parameters defining the target shape of the combined pdf of marks and spaces) are defined at the time of installation for all network configurations or are re-adjusted after a network reconfiguration by repeating the procedure described for the time of installation.

Embodiment 5

Figure 14:
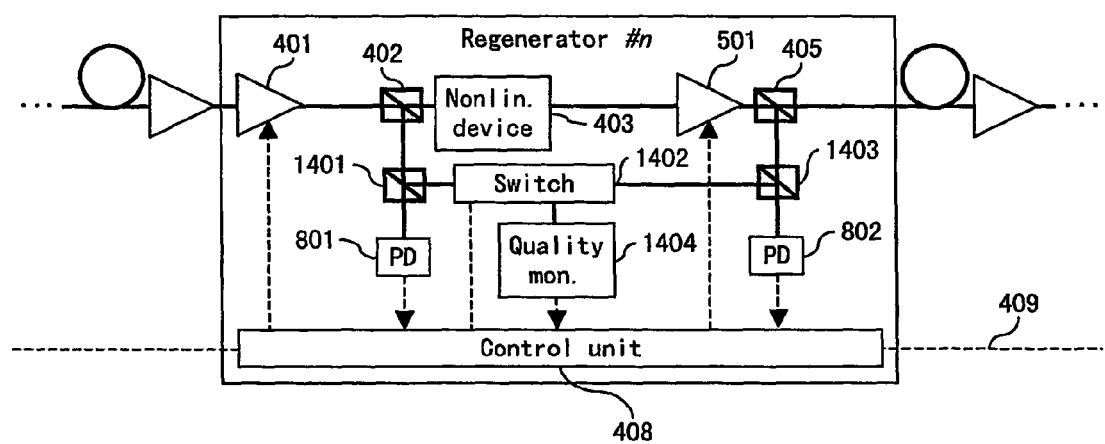
FIG. 14 shows an optical regenerator in which the signal to be monitored can be selected by an optical switch.

In the fifth preferred embodiment, each regenerator in the previous embodiments is replaced with a regenerator as shown in FIG. 14. In this case, the monitoring device 406 comprises an optical coupler 1401 and a photodiode 801 and the monitoring device 407 comprises an optical coupler 1403 and a photodiode 802. Moreover, the regenerator comprises an optical switch 1402 and a signal quality monitor 1404. The input signal light tapped by the optical coupler 402 branches at the optical coupler 1401 to the photo diode 801 and the optical switch 1402. The output signal light tapped by the optical coupler 405 branches at the optical coupler 1403 to the photodiode 802 and the optical switch 1402. The optical switch 1402 allows selecting one of the input and the output signal and provides the selected signal to the signal quality monitor 1404, which can be used to monitor the input or the output signal quality. The signal quality can be used as a feedback in the same way as described in the previous embodiments. This configuration allows using the same optical signal monitor 1404 to monitor either the input or the output signal. Variations of target value setting procedures in embodiment 5 are same as those in embodiments 3 and 4.

In the above described preferred embodiments, the output power adjustment scheme shown in FIG. 5 is employed and the optical amplifier 501 is used as the adjusting device 404. In the present invention, however, the other adjustment schemes shown in FIGS. 6 and 7 can also be employed as other preferred embodiments.

Figure 16:
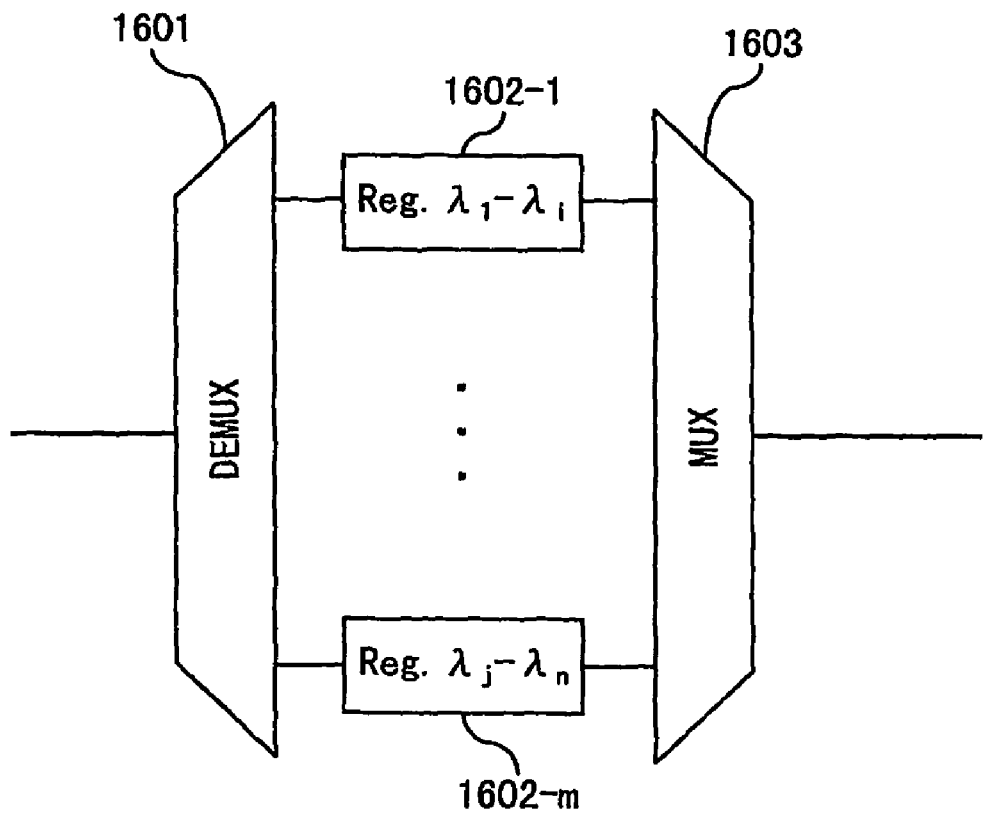
FIG. 16 shows a configuration of a regenerator node in a WDM system in which an optical signal with a group of wavelengths is regenerated.

Furthermore, configurations as shown in FIGS. 15 and 16 can be employed for a regenerator node in a wavelength division multiplexing (WDM) system.

The regenerator node shown in FIG. 15 comprises a demultiplexer 1501, optical regenerators 1502-1 through 1502-n, and a multiplexer 1503. The demultiplexer 1501 produces an optical signal with each wavelength $\lambda_i$ from an input optical signal. Each regenerator 1502-i (i=1, ..., n) corresponds to the optical regenerator in one of the previous embodiments and regenerates an optical signal with each wavelength $\lambda_i$ separately. The multiplexer 1503 produces an output optical signal from the regenerated optical signals.

The regenerator node shown in FIG. 16 comprises a demultiplexer 1601, optical regenerators 1602-1 through 1602-m, and a multiplexer 1603. In this case, each regenerator 1602-i (i=1, ..., m) corresponds to the optical regenerator in one of the previous embodiments and regenerates an optical signal with a group of wavelengths. If there is more than one wavelength group, demultiplexing by the demultiplexer 1601 and multiplexing by the multiplexer 1603 are required.

As described in detail above, according to the present invention, an optical regenerator monitoring and adjusting the optical input power to a nonlinear device is obtained. Determining a target value for the input power in an appropriate way based on the signal quality in the optical fiber communication system, the optical regenerator operates at an optimized operation point.

The invention claimed is:

1. An optical fiber transmission system comprising an optical transmitter, an optical receiver, an optical fiber to connect the transmitter with the receiver, a plurality of optical amplifiers along the optical fiber to compensate absorption losses of a signal light passing through the optical fiber, and at least one optical regenerator, wherein the optical regenerator including:

an optical amplifier at an input of the regenerator;

an all-optical nonlinear device to provide a nonlinear transfer function between optical input power of an optical signal after the optical amplifier and optical output power of an optical signal after the nonlinear device;

an adjusting device to receive the optical signal after the nonlinear device, adjust the optical output power of the optical signal after the nonlinear device to a level of launch power from the regenerator, and output an adjusted optical signal;

a first monitoring device including a photodiode to measure the optical input power of the optical signal after the optical amplifier and output a first monitoring signal;

a second monitoring device to monitor an optical signal after the adjusting device and output a second monitoring signal; and a control unit to receive the first and second monitoring signals, control the optical amplifier based on the first monitoring signal to adjust an optical input power to the nonlinear device to a preset value, control the adjusting device based on the second monitoring signal, and communicate with one of another optical regenerator and a receiver via an optical supervisory channel, wherein a target value of an average input power to the nonlinear device detected by the photodiode is set as the preset value at a time of installation of the regenerator in the optical fiber transmission system, wherein the optical input power to the nonlinear device of each regenerator is adjusted such that a bit error rate at the receiver is minimized and an adjusted value is stored as the target value at the time of installation, wherein a procedure of setting the target value is performed in backward direction starting from a regenerator closest to the receiver, and wherein the optical supervisory channel is used for communication between a location of the receiver and each regenerator.

2. An optical fiber transmission system comprising an optical transmitter, an optical receiver, an optical fiber to connect the transmitter with the receiver, a plurality of optical amplifiers along the optical fiber to compensate absorption losses of a signal light passing through the optical fiber, and at least one optical regenerator, wherein the optical regenerator including:

an optical amplifier at an input of the regenerator;

an all-optical nonlinear device to provide a nonlinear transfer function between optical input power of an optical signal after the optical amplifier and optical output power of an optical signal after the nonlinear device;

an adjusting device to receive the optical signal after the nonlinear device, adjust the optical output power of the optical signal after the nonlinear device to a level of launch power from the regenerator, and output an adjusted optical signal;

a first monitoring device including a photodiode to measure the optical input power of the optical signal after the optical amplifier and output a first monitoring signal;

a second monitoring device to monitor an optical signal after the adjusting device and output a second monitoring signal; and a control unit to receive the first and second monitoring signals, control the optical amplifier based on the first monitoring signal to adjust an optical input power to the nonlinear device to a preset value, control the adjusting device based on the second monitoring signal, and communicate with one of another optical regenerator and a receiver via an optical supervisory channel, wherein a target value of an average input power to the nonlinear device detected by the photodiode is set as the preset value at a time of installation of the regenerator in the optical fiber transmission system, wherein the optical input power to the nonlinear device of each regenerator is adjusted such that a bit error rate before a nonlinear device in a subsequent regenerator or at the receiver in case of the last regenerator is minimized and an adjusted value is stored as the target value at the time of installation, and wherein a procedure of setting the target value is performed in forward direction starting from a regenerator closest to the transmitter.

3. A reconfigurable optical network comprising optical transmitters, optical receivers, at least one optical reconfigurable network node, optical fibers to connect the transmitters with the receivers via the reconfigurable nodes, a plurality of optical amplifiers along the optical fibers to compensate absorption losses of a signal light passing through the optical fiber, at least one optical regenerator, and a network control unit utilizing the optical supervisory channel to communicate with the transmitters, receivers, reconfigurable network node, and regenerator, wherein the optical regenerator including:

an optical amplifier at an input of the regenerator;

an all-optical nonlinear device to provide a nonlinear transfer function between optical input power of an optical signal after the optical amplifier and optical output power of an optical signal after the nonlinear device;

an adjusting device to receive the optical signal after the nonlinear device, adjust the optical output power of the optical signal after the nonlinear device to a level of launch power from the regenerator, and output an adjusted optical signal;

a first monitoring device including a photodiode to measure the optical input power of the optical signal after the optical amplifier and output a first monitoring signal;

a second monitoring device to monitor an optical signal after the adjusting device and output a second monitoring signal; and a control unit to receive the first and second monitoring signals, control the optical amplifier based on the first monitoring signal to adjust an optical input power to the nonlinear device to a preset value, control the adjusting device based on the second monitoring signal, and communicate with one of another optical regenerator and a receiver via an optical supervisory channel, wherein a target value of an average input power to the nonlinear device detected by the photodiode is set as the preset value at a time a new optical path is established in the reconfigurable optical network, wherein the optical input power to the nonlinear device of each regenerator is adjusted such that a bit error rate at a receiver is minimized and an adjusted value is stored as the target value at the time the new optical path is established, wherein a procedure of setting the target value is performed in backward direction along the new optical path starting from a regenerator closest to the receiver, and wherein the optical supervisory channel is used for communication between a location of the receiver and each regenerator.

4. A reconfigurable optical network comprising optical transmitters, optical receivers, at least one optical reconfigurable network node, optical fibers to connect the transmitters with the receivers via the reconfigurable nodes, a plurality of optical amplifiers along the optical fibers to compensate absorption losses of a signal light passing through the optical fiber, at least one optical regenerator, and a network control unit utilizing the optical supervisory channel to communicate with the transmitters, receivers, reconfigurable network node, and regenerator, wherein the optical regenerator including:

an optical amplifier at an input of the regenerator;

an all-optical nonlinear device to provide a nonlinear transfer function between optical input power of an optical signal after the optical amplifier and optical output power of an optical signal after the nonlinear device;

an adjusting device to receive the optical signal after the nonlinear device, adjust the optical output power of the optical signal after the nonlinear device to a level of launch power from the regenerator, and output an adjusted optical signal;

a first monitoring device including a photodiode to measure the optical input power of the optical signal after the optical amplifier and output a first monitoring signal;

a second monitoring device to monitor an optical signal after the adjusting device and output a second monitoring signal; and a control unit to receive the first and second monitoring signals, control the optical amplifier based on the first monitoring signal to adjust an optical input power to the nonlinear device to a preset value, control the adjusting device based on the second monitoring signal, and communicate with one of another optical regenerator and a receiver via an optical supervisory channel, wherein a target value of an average input power to the nonlinear device detected by the photodiode is set as the preset value at a time of installation of the regenerator in the reconfigurable optical network, wherein the optical input power to the nonlinear device of each regenerator is adjusted such that a bit error rate before a nonlinear device in a subsequent regenerator along an optical path or at a receiver in case of the last regenerator is minimized and an adjusted value is stored as the target value at the time of installation, and wherein a procedure of setting the target value is performed in forward direction starting from a regenerator closest to a transmitter.

5. A method of controlling an optical regenerator which comprises an all-optical nonlinear device to provide a nonlinear transfer function between optical input power of an optical signal before the nonlinear device and optical output power of an optical signal after the nonlinear device, the method comprising:

amplifying the optical signal before the nonlinear device by an optical amplifier;

monitoring an amplified optical signal between the optical amplifier and the nonlinear device to generate a monitoring signal; and controlling the optical amplifier based on the monitoring signal, wherein a target value of the optical input power of the optical signal before the nonlinear device is preset at a time of installation of the regenerator in an optical fiber transmission system, by adjusting the optical input power such that a bit error rate at a receiver in the optical fiber transmission system is minimized and storing an adjusted value as the target value, and wherein a procedure of setting the target value is performed in backward direction starting from a regenerator closest to the receiver.

6. A method of controlling an optical regenerator which comprises an all-optical nonlinear device to provide a nonlinear transfer function between optical input power of an optical signal before the nonlinear device and optical output power of an optical signal after the nonlinear device, the method comprising:

amplifying the optical signal before the nonlinear device by an optical amplifier;

monitoring an amplified optical signal between the optical amplifier and the nonlinear device to generate a monitoring signal; and controlling the optical amplifier based on the monitoring signal, wherein a target value of the optical input power of the optical signal before the nonlinear device is preset at a time of installation of the regenerator in an optical fiber transmission system, by adjusting the optical input power such that a bit error rate before a nonlinear device in a subsequent regenerator or at a receiver in case of the last regenerator in the optical fiber transmission system is minimized and storing an adjusted value as the target value, and wherein a procedure of setting the target value is performed in forward direction starting from a regenerator closest to a transmitter in the optical fiber transmission system.

7. A method of controlling an optical regenerator which comprises an all-optical nonlinear device to provide a nonlinear transfer function between optical input power of an optical signal before the nonlinear device and optical output power of an optical signal after the nonlinear device, the method comprising:

amplifying the optical signal before the nonlinear device by an optical amplifier;

monitoring an amplified optical signal between the optical amplifier and the nonlinear device to generate a monitoring signal; and controlling the optical amplifier based on the monitoring signal, wherein a target value of the optical input power of the optical signal before the nonlinear device is preset at a time a new optical path is established in a reconfigurable optical network, by adjusting the optical input power such that a bit error rate at a receiver in the reconfigurable optical network is minimized and storing an adjusted value as the target value, and wherein a procedure of setting the target value is performed in backward direction along the new optical path starting from a regenerator closest to the receiver.

8. A method of controlling an optical regenerator which comprises an all-optical nonlinear device to provide a nonlinear transfer function between optical input power of an optical signal before the nonlinear device and optical output power of an optical signal after the nonlinear device, the method comprising:

amplifying the optical signal before the nonlinear device by an optical amplifier;

monitoring an amplified optical signal between the optical amplifier and the nonlinear device to generate a monitoring signal; and controlling the optical amplifier based on the monitoring signal, wherein a target value of the optical input power of the optical signal before the nonlinear device is preset at a time of installation of the regenerator in a reconfigurable optical network, by adjusting the optical input power such that a bit error rate before a nonlinear device in a subsequent regenerator along an optical path or at a receiver in case of the last regenerator in the reconfigurable optical network is minimized and storing an adjusted value as the target value, and wherein a procedure of setting the target value is performed in forward direction starting from a regenerator closest to a transmitter in the reconfigurable optical network.

* * * * *